United States Patent
Rothwell

(10) Patent No.: US 11,172,706 B2
(45) Date of Patent: Nov. 16, 2021

(54) LASER WELDING METHOD FOR JOINING A SOLID AND POROUS METAL COMPONENT

(71) Applicant: NICOVENTURES HOLDINGS LIMITED, London (GB)

(72) Inventor: Howard Rothwell, London (GB)

(73) Assignee: NICOVENTURES TRADING LIMITED, London (GB)

(*) Notice: Subject to any disclaimer, the term of this patent is extended or adjusted under 35 U.S.C. 154(b) by 145 days.

(21) Appl. No.: 16/335,090

(22) PCT Filed: Sep. 11, 2017

(86) PCT No.: PCT/GB2017/052645
§ 371 (c)(1),
(2) Date: Mar. 20, 2019

(87) PCT Pub. No.: WO2018/055333
PCT Pub. Date: Mar. 29, 2018

(65) Prior Publication Data
US 2019/0217415 A1 Jul. 18, 2019

(30) Foreign Application Priority Data
Sep. 22, 2016 (GB) .................................... 1616135

(51) Int. Cl.
*B23K 26/21* (2014.01)
*A24F 40/46* (2020.01)
(Continued)

(52) U.S. Cl.
CPC .............. *A24F 40/46* (2020.01); *A24F 40/70* (2020.01); *B23K 26/0624* (2015.10);
(Continued)

(58) Field of Classification Search
CPC .. B23K 26/323; B23K 26/0624; B23K 26/21; B23K 26/703; B23K 26/0626;
(Continued)

(56) References Cited

U.S. PATENT DOCUMENTS 8,833,364 B2    9/2014  Buchberger
2014/0283825 A1* 9/2014  Buchberger .......... A24F 47/002
                                           128/202.21

(Continued)

FOREIGN PATENT DOCUMENTS

CN    2395749 Y     9/2000
JP    H05317624 A   12/1993
(Continued)

OTHER PUBLICATIONS

Decision to Grant dated Oct. 19, 2019 for Russian Application No. 2019107882, 12 pages.
(Continued)

*Primary Examiner* — Brian W Jennison
(74) *Attorney, Agent, or Firm* — Patterson Thuente Pedersen, P.A.

(57) ABSTRACT

In a method of laser welding, a solid metal component is placed in contact with a porous metal component at an interface region, a laser beam is directed onto the solid metal component to cause heating and melting of one or more portions of the solid metal component in the interface region, and the melted metal portions flow into interstices in the porous metal component and then solidify by cooling such that portions of the porous metal component adjacent the interstices are integrated into the metal of the solid metal component thereby bonding the solid metal component and the porous metal component.

15 Claims, 4 Drawing Sheets

(51) Int. Cl.
  *B23K 26/32* (2014.01)
  *B23K 26/06* (2014.01)
  *B23K 26/0622* (2014.01)
  *B23K 28/02* (2014.01)
  *A24F 40/70* (2020.01)
  *B23K 26/323* (2014.01)
  *B23K 26/70* (2014.01)
  *H05B 3/00* (2006.01)
  *B23K 103/04* (2006.01)
  *A24F 40/10* (2020.01)

(52) U.S. Cl.
  CPC .......... *B23K 26/0626* (2013.01); *B23K 26/21* (2015.10); *B23K 26/32* (2013.01); *B23K 26/323* (2015.10); *B23K 26/703* (2015.10); *B23K 28/02* (2013.01); *H05B 3/0014* (2013.01); *A24F 40/10* (2020.01); *B23K 2103/05* (2018.08)

(58) Field of Classification Search
  CPC .... B23K 26/32; B23K 28/02; B23K 2103/05; A24F 47/002; A24F 47/008; H05B 3/0014; H05B 3/44; H05B 3/12; H05B 3/26
  See application file for complete search history.

(56) References Cited

U.S. PATENT DOCUMENTS

2014/0361464 A1* 12/2014 Holcomb ........... B23K 37/0426
  264/431
2015/0140351 A1* 5/2015 Berger .................... F16B 2/005
  428/594

FOREIGN PATENT DOCUMENTS

| | | | |
|---|---|---|---|
| JP | H10106433 A | | 4/1998 |
| JP | 2000106169 A | | 4/2000 |
| JP | 2001276582 A | * | 10/2001 |
| JP | 2006107868 A | | 4/2006 |
| JP | 2006205093 A | | 8/2006 |
| JP | 2012506263 A | | 3/2012 |
| KR | 20150053807 A | | 5/2015 |
| KZ | 30993 B | | 3/2016 |
| RU | 2038217 C1 | | 6/1995 |
| RU | 2351447 C2 | | 4/2009 |
| RU | 2570499 C2 | | 12/2015 |
| RU | 2574549 C2 | | 2/2016 |
| WO | WO-2014139610 A1 | | 9/2014 |
| WO | WO-2016092261 A1 | | 6/2016 |

OTHER PUBLICATIONS

International Preliminary Report on Patentability for Application No. PCT/GB2017/052645, dated Jan. 23, 2019, 14 pages.
International Search Report and Written Opinion for Application No. PCT/GB2017/052645, dated Jan. 11, 2018, 11 pages.
Notice of Allowance dated Aug. 25, 2020 for Japanese Application No. 2019-507934, 5 pages.
Notice of Reasons for Refusal dated Apr. 14, 2020 for Japanese Application No. 2019-507934, 12 pages.
Office Action dated Jul. 28, 2020 for Korean Application No. 10-2019-7007728, 14 pages.
Search Report for Chinese Application No. 201780058298.3 dated May 8, 2020, 3 pages.

* cited by examiner

LASER WELDING METHOD FOR JOINING A SOLID AND POROUS METAL COMPONENT

The present application is a National Phase entry of PCT Application No. PCT/GB2017/052645, filed Sep. 11, 2017, which claims priority from GB Patent Application No. 1616135.8, filed Sep. 22, 2016, which is hereby fully incorporated herein by reference.

TECHNICAL FIELD

The present disclosure relates to methods of laser welding and items fabricated using laser welding methods.

BACKGROUND

Aerosol provision systems such as nicotine delivery systems (e.g. electronic cigarettes or e-cigarettes) generally contain a reservoir of a source liquid containing a formulation, typically including nicotine, from which an aerosol is generated through vaporization or other means. Thus an aerosol source for an aerosol provision system may comprise a heating element coupled to a portion of the source liquid from the reservoir. When a user inhales on the device, the heating element is activated to vaporize a small amount of the source liquid, which is thus converted to an aerosol for inhalation by the user. Typically, the heating element is made from an electrically conductive material and is connected to an electrical power supply such as a battery which causes electrical current to flow through the heating element so that the element is heated, in turn heating and vaporizing the source liquid.

In such an arrangement, the heating element is electrically connected to the power supply via a pair of electrical contacts, also made from conductive material such as metal. While the heating element and the contacts might be arranged to touch one another, a physical bond or joint between the heating element and the electrical contacts provides a more secure electrical connection.

Soldering is a technique for providing a physical bond between metal components such as conducting elements in an electrical circuit. A filler metal, known as solder and having a lower melting point than the conducting elements to be joined, is melted by heating so that it flows into the joint region and forms a physical bond connecting the components once it has cooled and solidified. Impurities in the joint region can impair the success of the soldered joint; this can be addressed by the use of a flux material to prevent oxidation during the soldering process and/or provide some chemical cleaning by corrosion. However, in the context of aerosol nicotine delivery systems, flux materials may be attacked by nicotine in the heating element environment leading to contamination of the aerosol.

Hence, alternatives techniques for forming electrical connections between a heating element and its electrical contacts are of interest.

SUMMARY

According to a first aspect of certain embodiments described herein, there is provided a method of laser welding comprising: placing a solid metal component in contact with a porous metal component at an interface region; directing a laser beam onto the solid metal component to cause heating and melting of one or more portions of the solid metal component in the interface region; and allowing the melted metal portions to flow into interstices in the porous metal component and solidify by cooling such that portions of the porous metal component adjacent the said interstices are integrated into the metal of the solid metal component thereby bonding the solid metal component and the porous metal component.

The porous metal component may comprise a mesh of metal fibers sintered together, the portions of the porous metal component adjacent the said interstices which are integrated into the metal of the solid metal component being metal fibers. One or both of the solid metal component and the porous metal component may comprise stainless steel.

The laser beam may be operated for a first time period at a high output power level and then for a second time period at a lower output power level less than the high output power level. For example, the first time period and the second time period may have durations with a ratio in the range of 1:3 to 1:80. The lower output power level may be between 40% and 60% of the high output power level. Also, the first time period may be preceded by an initial period during which the output power level of the laser is increased from zero to the high output power level. The high output power level may be in the range of 1 kW to less than 1.8 kW. The laser beam may deliver a total amount of energy to the metal components in the range of more than 4.5 J to less than 8.0 J.

The method may further comprise applying a force across the interface region to compress the solid metal component and the porous metal component while the laser beam is directed onto the solid metal component.

The solid metal component may have a thickness in the range of 0.05 mm to 0.5 mm.

The solid metal component may be an electrical contact and the porous metal component may be a heating element for forming an aerosol from a liquid in an aerosol provision system.

According to a second aspect of certain embodiments provided herein, there is provided an assembly comprising a solid metal component and a porous metal component bonded together at a weld by portions of the porous metal component adjacent to interstices in the porous metal component that are integrated into at least one portion of the solid metal component that has entered the interstices.

According to a third aspect of certain embodiments provided herein, there is provided an assembly comprising a solid metal component and a porous metal component that have been bonded together at a weld made by or obtainable by a laser welding method according to a method of the first aspect.

In such assemblies, the weld may have an electrical resistance to electric current flowing from one of the solid metal component and the porous metal component to the other component of 10 mOhms or less.

According to a fourth aspect of certain embodiments provided herein, there is provided a method of laser welding comprising: arranging a solid metal component in contact with a porous metal component comprising of a plurality of sintered metal strands; directing a laser beam onto the solid metal component to deliver energy thereto; allowing the energy to heat and melt at least a portion of the solid metal component which is in contact with the porous metal component so that the melted metal flows around metal strands in the porous metal component; removing the laser beam; and cooling the melted metal that has flowed around the metal strands so that the metal strands are embedded into the solid metal component to bond it to the porous metal component.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, a laser welding method may be provided in accordance with approaches described herein which includes any one or more of the various features described below as appropriate.

BRIEF DESCRIPTION OF THE DRAWINGS

Various embodiments will now be described in detail by way of example only with reference to the accompanying drawings in which.

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

The present disclosure relates to a method of laser welding which may be used in the manufacture of an aerosol provision system such an e-cigarette (the method is not so limited, however, and is also applicable in other contexts). Throughout the following description the term "e-cigarette" may sometimes be used; however, it will be appreciated that this term may be used interchangeably with aerosol (vapor) provision system.

Figure 1:
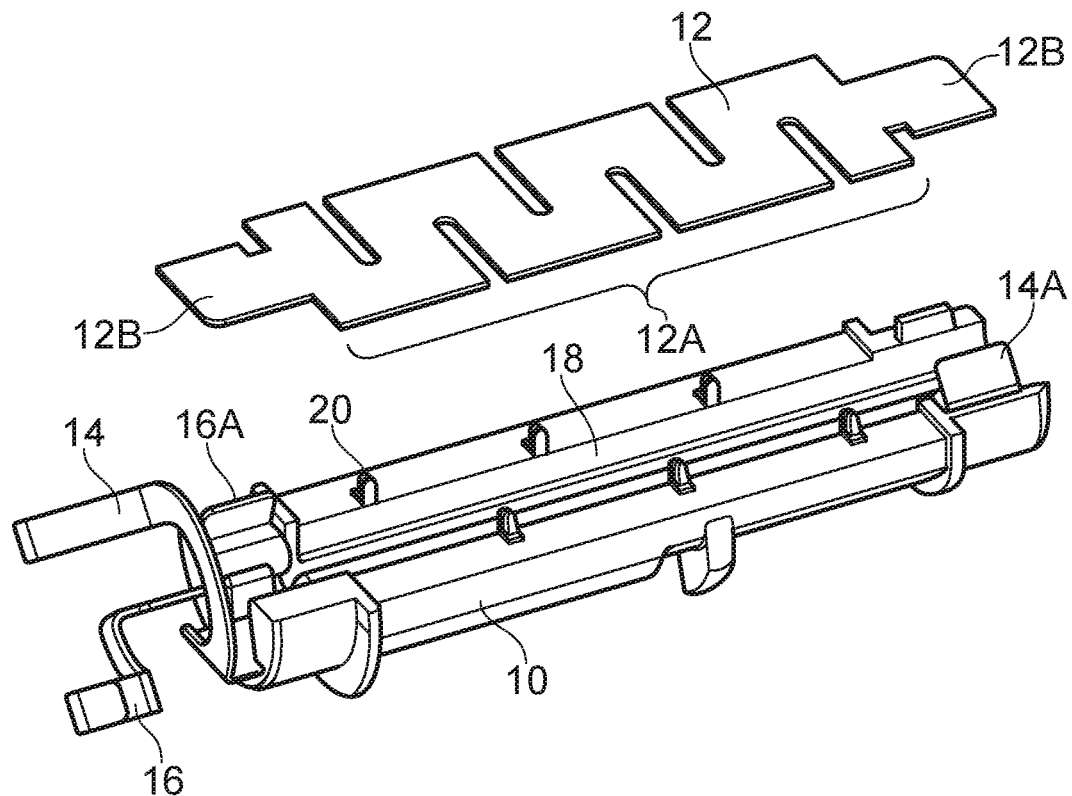
FIGS. 1 and 2 show perspective views of an assembly including components that may be welded using embodiments of the disclosure.

FIG. 1 is a schematic representation of some components of a heating element carrier module which may be used in a cartridge assembly of an aerosol provision system, where the cartridge assembly is a part of the system intended to store the source liquid and produce the aerosol therefrom. Embodiments of the disclosure may be used in the fabrication of such an assembly.

Component 10 in FIG. 1 is a lower part of an element of the carrier module configured for supporting the heating element 12. This support element may be referred to as a cradle, with the part 10 designated as a lower cradle. An upper cradle (not shown) fits over the lower cradle 10 to sandwich and support the heating element therebetween. The assembly further comprises the heating element 12, a first electrical contact element 14 for connecting to a first end of the heating element 12 and a second electrical contact element 16 for connecting to a second end of the heating element 12.

The lower cradle 10 in this example is molded from a plastics material having a high glass fiber content. Each of the upper and lower cradles is provided with a recess 18 (only visible for the lower cradle 10 in FIG. 1) running along its length so that when the two cradle components are brought together to sandwich the heating element 12 they form a cradle having a generally tubular configuration with an airflow path defined by the respective recesses 18 running down the interior of the tube and in which the heating element 12 is disposed.

The first and second electrical contact elements 14, 16 may be formed of a sheet metal material, for example comprising copper strips formed into an appropriate shape having regard to the shape and configuration of the other elements of the apparatus in accordance with conventional manufacturing techniques. In other cases the first and second electrical contact elements 14, 16 may comprise conventional flexible wiring. In some examples the first and/or second electrical contact elements may be provided with plating, for example gold or silver plating, to help lower contact resistance and/or reduce the risk of corrosion.

Figure 2:
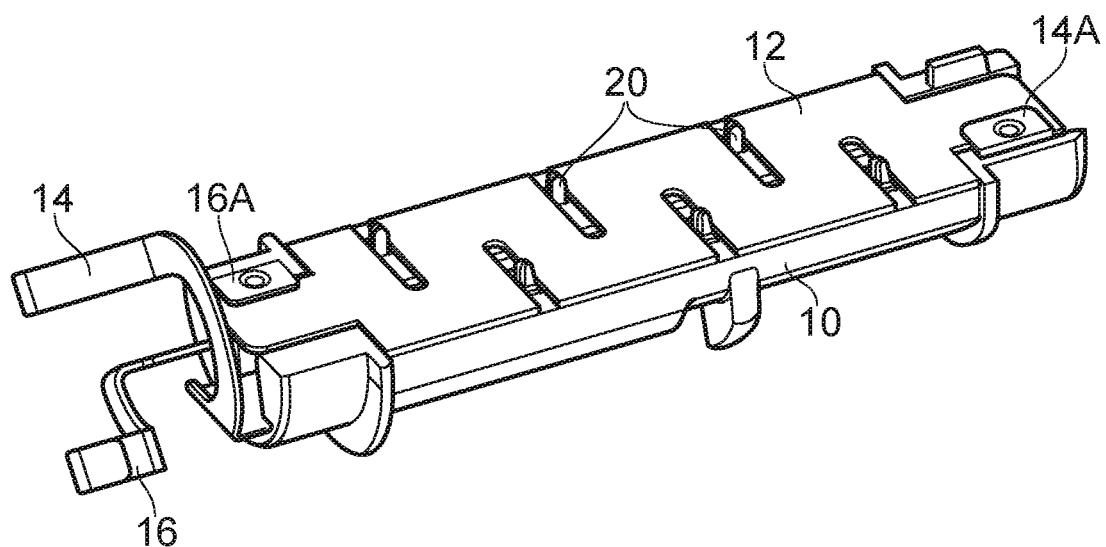

In this example of a cartridge assembly, the heating element 12 is formed from a sintered metal fiber material and is generally in the form of a sheet. The nature and structure of the heating element are discussed further below. In this particular example the heating element 12 comprises a main portion 12A with electrical contact extensions 12B at each end for connecting to the respective electrical contact elements 14, 16. In this example, the main portion 12A of the heating element is generally rectangular with a length (i.e. in a direction running between the electrical contact extensions 12B) of around 20 mm and a width of around 8 mm. The thickness of the sheet comprising the heating element 12 in this example is around 0.15 mm. As can be seen in FIG. 2, the generally-rectangular main portion 12A of the heating element 12 has slots extending inwardly from each of the longer sides; this shaping forces current flow along the heating element 12 from one electrical contact extension 12B to the other to follow a meandering path which results in a concentration of current, and hence electrical power, around the ends of the slots. The resulting heating distribution and corresponding temperature gradients can be desirable in the context of aerosol provision systems. Note that this shape, size and configuration of heating element is merely an example; embodiments of the disclosure are applicable to other configurations of heating element and indeed to other metallic components of similar composition.

As shown in FIG. 1, the first and second electrical contact elements 14, 16 have been mounted to the lower cradle 10 and the heating element 12 is represented above the lower cradle 10 ready to be put in place. The second electrical contact element 16 is mounted at a second end of the lower cradle 10 (the leftmost end for the orientation in FIG. 1). The lower cradle 10 is profiled to receive and match the shape of a first portion of the second electrical contact element 16 in accordance with conventional manufacturing techniques for mounting electrical conductors to plastic body parts. One end of the second electrical contact element 16 provides a second electrical contact element flap portion 16A for connection to one of the electrical contact extensions 12B of the heating element 12 while the other end of the second electrical contact element 16 extends away from the lower cradle 10 as schematically represented in the figure. The first electrical contact element 14 is mounted so as to run along the length of the lower cradle 10 adjacent a wall of the recess 18. As with the second electrical contact element 16, one end of the first electrical contact element 14 extends away from the second end of the lower cradle 10 as schematically represented in the figure. The other end of the first electrical contact element 14 provides a first electrical contact element flap portion 14A arranged at a first end of the lower cradle 10 (rightmost end in FIG. 1) for receiving the other of the electrical contact extensions 12B of the heating element 12.

An upper surface of the lower cradle 10 comprises a plurality of locating pegs 20 which align with the slots in the heating element 12 and also with corresponding locating holes in the upper cradle (not shown in the figures). These locating pegs are for helping to align the upper cradle 10 with the lower cradle, and for helping to align the heating element 12 relative to the upper and lower cradles 10 when assembled.

FIG. 2 schematically shows the heating element 12 mounted to the lower cradle 10 containing the first and second electrical contact elements 14, 16. The heating element 12 is mounted to the lower cradle 10 simply by being placed on the upper surface of the lower cradle 10 with the locating pegs 20 aligned with the slots of the heating element 12. The first and second electrical contact element flap portions 14A, 16A are bent down so as to extend over and/or around respective ones of the electrical contact extensions 12B at each end of the heating element 12. To provide a good mechanical and electrical connection, the electrical contact element flap portions 14A and 16A are physically bonded to the electrical contact extensions 12B of the heating element 12 by a laser welding method according to embodiments of the disclosure.

Note that the heating element and electrical contacts described with regard to FIGS. 1 and 2 are merely one example of components that may be joined by laser welding according embodiments of the disclosure. Other configurations of these components in different types of aerosol provision systems may also be joined by embodiment methods, and embodiments of the method are also applicable for joining components of other products, systems and apparatus. Also, while the example of FIGS. 1 and 2 shows the electrical contacts mounted onto the lower cradle before connection to the heating element, embodiments of the method are not so limited, and connection or joining by the laser welding can be carried out before assembly of the welded parts to other components. As discussed above, the heating element of the example is formed from a sintered metal fiber material and is generally in the form of a sheet. Material of this sort can be thought of a mesh or irregular grid, and is created by sintering together a randomly aligned arrangement or array of spaced apart metal fibers or strands. A single layer of fibers might be used, or several layers, for example up to five layers. As an example, the metal fibers may have a diameter of 8 micrometers, arranged to give a sheet of thickness 0.16 mm, and spaced to produce a material density of 200 to 250 g/m$^2$ and a porosity of 84%. The purpose of this material structure, comprising randomly arranged metal fibers with interstices between, is to provide a porous metal material in which fluid (liquid and gas) is able to penetrate into and flow along and through the interstices. In the context of an aerosol provision system heating element, the porous structure is able to wick the source fluid by capillary action and bring it directly into contact with the heated metal when electrical current is passed through the heating element. Other porous conducting materials may be used for this particular application, however. Welding methods of the disclosure are applicable to other porous metallic structures, not just a sintered mesh. For example, a sheet woven or knitted from metal fibers is similarly porous. A crumpled or folded metal sheet, or a solid metal block with holes created therein by molding, mechanical drilling or piercing or laser drilling might be appropriately porous for some uses. In the context of this application, a porous metal material or structure means an item, component or element made from one or more metals and having therein a regular, irregular or random network or array of holes, channels or interstices on a millimeter, millimeter or smaller scale, through which fluid can flow. For example, the porous metal material or structure may have a porosity of 66% or greater, or 70% or greater, or 75% or greater, or 80% or greater or 85% or greater, or 86% or greater. In examples, the porosity is substantially 84%. The material may or may not be made from metal fibers or strands. Also, any metal might be used, depending on the nature of its intended use. For a porous material made from metal fibers or strands, the material might comprise fibers of one metal only, or fibers of two or more metals in any proportion. As an example, in a heating element for an aerosol provision system, the metal might be stainless steel, for example stainless steel 301. Other metals include other stainless steels, non-stainless steel, iron, copper, tungsten, aluminum, brass and other alloys, or any other metal (element, compound or alloy).

Conversely, the electrical contacts to be welded to the heating element in the example of FIGS. 1 and 2 are made from solid metal, lacking the interstitial structure of a porous metal material, and therefore lacking significant porosity. For example, a solid metal may have a porosity of 10% or less, or 7.5% or less, or 5% or less, or 2.5% or less, or 1% or less, or 0.5% or less, or 0.25% or less. Also, the solid metal component is likely more dense than the porous metal component, i.e. it has a higher density. Embodiments of the disclosure propose that laser welding be used to fuse or bond a solid metal component to a porous metal component, thereby providing an electrical connection and/or a mechanical join between such components without the need for soldering and associated use of flux. The solid component may also be of any metal, according to its intended use. As an example, in an aerosol provision system, electrical contacts for connection to a heating element might be made from stainless steel, such as stainless steel 316L. Other metals include other stainless steels, non-stainless steel, iron, copper, tungsten, aluminum, brass and other alloys, or stainless steel plated with aluminum, or any other metal or combination of metals (element, compound, alloy or plated or laminated construction).

For the solid and porous metal components, the term "component" is intended to cover any item or element made from the specified solid and porous metals, whether or not it is in a final form for part of a larger item or product and whether or not it will be used within a larger item or product. The aerosol delivery system of FIGS. 1 and 2 is merely an example of a product in which an embodiment of the disclosure may be employed; the disclosure is not limited thereto.

FIG. 3 shows a flow chart of a method according to an embodiment of the method.

In S1, a solid metal component and a porous metal component are selected, where it is desired that the two components be secured together, for example for the purpose of an electrical connection, a mechanical bond, or both.

The components may have a material and structure as described above, for example.

In S2, the solid metal component and the porous metal component are placed into the respective desired positions, in contact with one another. The area where contact is made can be considered as an interface region, the interface being between the surfaces of the two components. Depending on the size of the components and their arrangement within any final device, the interface region might be the full size of or smaller than the surface area of the contacting surfaces of one or both components. For example, in the FIG. 1 and FIG. 2 configuration, the interface region is most or all of the area of the electrical contact, but only a small part of the area of the heating element. In other examples, the two components may be positioned in an overlapping arrangement so that the interface region is smaller than both surface areas, or the components might have similarly sized contact surfaces so that the interface region comprises most or all of both surface areas.

The components can be held in the contacting position with a temporary clamping or holding means from which they are released after welding. Alternatively, the two components might be assembled into their desired final positions within a larger device or product and then welded together, as in the FIGS. 1 and 2 example. The correctly positioned components, held in position ready for welding, can be considered as a workpiece.

In S3, a beam of light from a laser is directed onto the outer (near) surface of the solid metal component, opposite to and substantially orthogonally to the interface region. In other words, the laser beam is directed onto the higher density component of the two metal components. The laser beam may be focused, with the focal point substantially at the near surface of the solid metal component, that is, the surface opposite the contacting surface in the interface region. Depending on the thickness of the solid metal component, the amount of energy to be delivered, and the size of the area to be welded, the focal point may instead be arranged above or below the plane of the near surface. The laser beam may be delivered via an optical fiber, or via one or more lenses, or a combination of both. The fiber and/or lenses may be mounted in a dedicated beam delivery head, configured for precise positioning to the required location above or otherwise adjacent to the workpiece (the appropriately arranged components). Examples of lasers suitable for use in laser welding include solid state lasers such as ruby lasers and Nd:YAG lasers, and gas lasers such as helium, nitrogen and carbon dioxide lasers.

In S4, energy from the laser beam is delivered to the weld site in the interface region. This is achieved by energy absorption and heat transfer. The laser beam directed onto the solid metal component near surface delivers energy to the metal. The energy is absorbed by the metal; this causes heating of the metal. The power and wavelength of the laser beam and the type of metal will determine how far the beam can penetrate into the metal, and a combination of direct energy absorption and transfer of heat from adjacent areas that have absorbed energy will produce heating in one or more parts of the solid metal component in the interface region, and cause the metal to melt. The thickness of the solid metal component relative to the laser penetration depth also plays a part in how the heating at the interface region is achieved. The skilled person will understand to adjust laser power and wavelength and component thickness to achieve the required melting, taking into account the thermal properties of the metal and its ability to dissipate heat. Some heating and melting may also occur in the porous metal structure.

In S5, the melted or molten metal from the solid component is able to flow outwardly from the surface of the solid component in the interface region. This will be enhanced if the laser beam and workpiece are arranged along a substantially vertical axis, with the laser beam being directed substantially downwardly onto the solid metal component, the components being arranged as two horizontal layers. The flow of the molten metal out from the surface is thereby assisted by gravity. This configuration is not essential, however. The molten metal is able to flow into the adjacent porous metal component, by entering the interstices in the porous structure, and thereby engulfing, encompassing or otherwise surrounding nearby fibers, strands or other parts of the porous structure.

In S6, the laser beam is turned off (or blocked or diverted from the workpiece) once a required amount of energy has been delivered. This is discussed further below.

In S7, once the source of energy (laser beam) is removed from the workpiece, the molten metal is able to cool and solidify. Since it has flowed into the interstices of the porous metal component, it remains there as it cools so that once it returns to its solid state the strands of the porous metal component are embedded within and integrated into the solid metal. This provides a mechanical join or bond between the two components, and the weld is complete.

While not wishing to be bound be theory, it is believed that the molten metal tends to flow in individual portions or "node" regions within the heated region, and each node forms as a nugget or nodule around a group of metal fiber strands in the porous structure (the strands may also undergo a degree of melting or softening). The resulting weld structures may be envisaged as pins (the strands or fibers) in a pincushion (a node or nugget). In other words, the molten metal flows into the interstices between the strands or other metal structures of the porous metal which are adjacent to the interstices in question, and surrounds or engulfs those portions of the porous metal component. Typically, a number of nodes will be created. The quantity of nodes per weld and the proportion of strands per node can be modified by adjusting the laser power and the laser beam delivery time; this is discussed further below. Both the mechanical strength of the weld and its electrical resistance depend on the node and strand proportion and configuration, so a weld can be tailored for good performance depending on its purpose (physical bond, electrical connection, or both).

Figure 3:
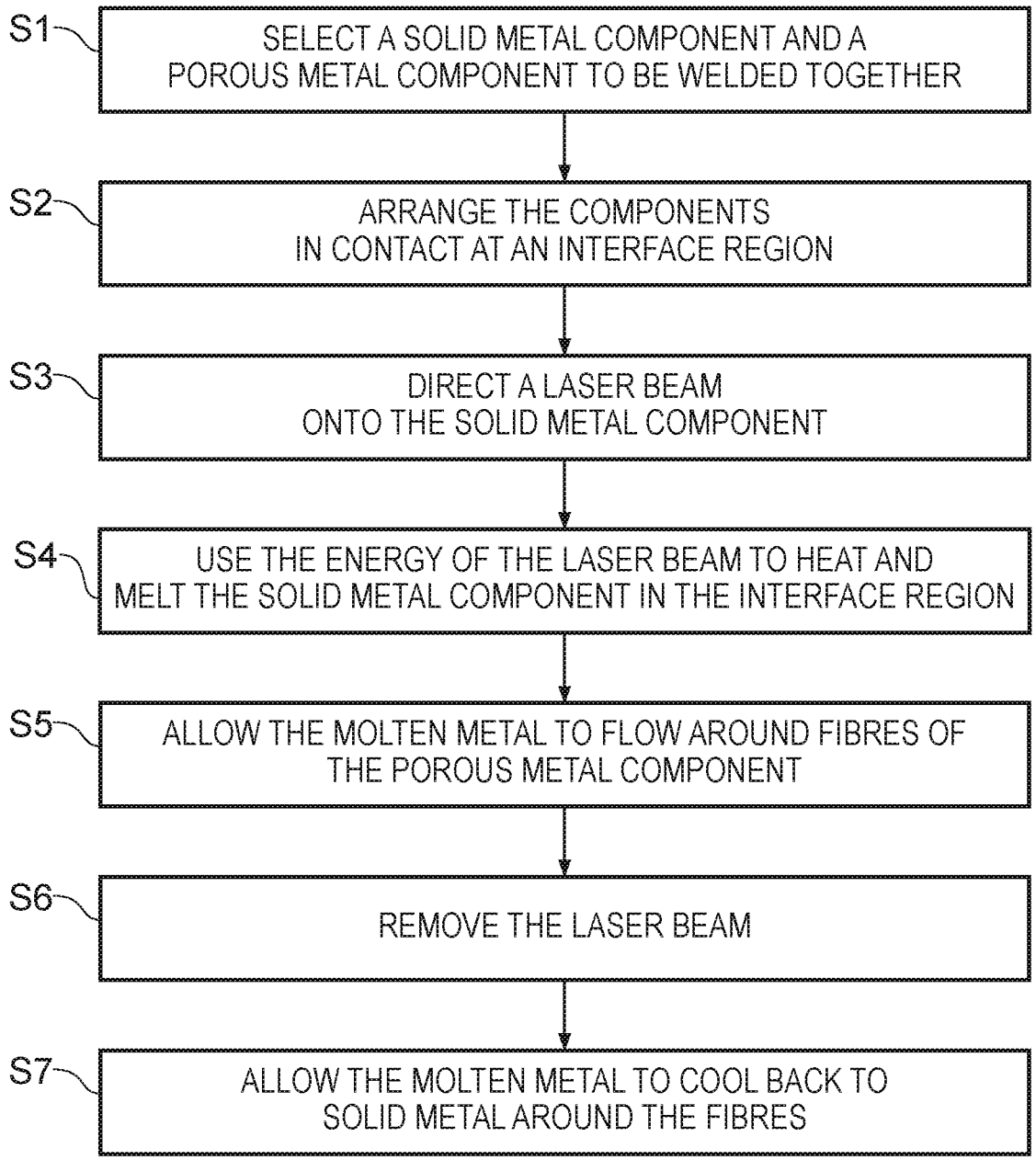
FIG. 3 shows a flow chart of steps in a method according to an embodiment of the disclosure.
Figure 4:
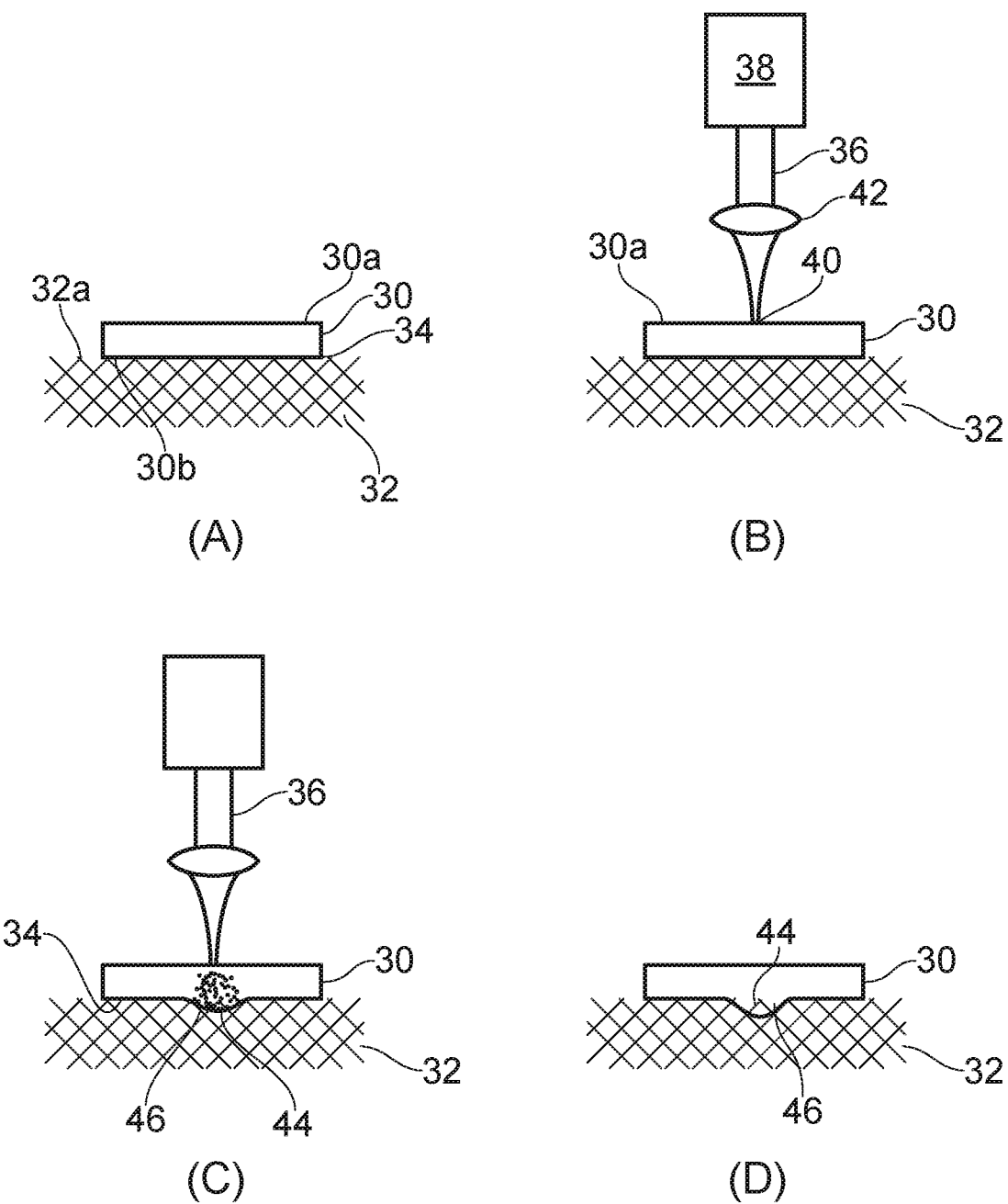
FIGS. 4(A), 4(B), 4(C) and 4(D) show schematic representations of apparatus for performing the example method of FIG. 3.

FIG. 4 shows schematic representations of apparatus for carrying out the method of FIG. 3. The representations are not to scale. In FIG. 4(A), a solid metal component 30 is arranged in contact with a porous metal component 32 comprising multiple strands of metal, for example sintered together. The solid metal component 30 has an (in the illustrated orientation) upper or near surface 30a, and an opposite lower surface 30b which is placed in contact with a surface 32a of the porous metal component. The two contact surfaces comprise an interface region 34, which in this example corresponds to the entire surface area of the lower surface 30b of the solid metal component 30 and part of the surface area of the upper surface 32a of the porous metal component 32. A weld is to be created in the interface region 34 to bond the two components.

In FIG. 4(B), a laser 38 generates a laser beam 36 which is shaped to a focal spot 40 by a lens (or multiple lenses) 42. The focus 40 is arranged on the near surface 30a of the solid metal component.

In FIG. 4(C), sufficient energy has been delivered to the solid metal component 30 by the laser beam 36 to cause heating through the solid metal component (indicated by the shaded area) and hence melting of the solid metal in the interface region. The molten metal has flowed around some strands 44 of the porous metal component 32, and formed a nodule 46.

In FIG. 4(D), the laser beam 36 has been removed and the molten part of the solid metal component 30 has cooled and solidified. The nodule 46 is thus now solid metal and has embedded within it parts of multiple strands 44 of the porous metal component 32. The two components 30, 32 are thus secured or fused together by this bond, which provides a physical, mechanical join and also an electrical connection where the components are metal and electrically conductive.

The configuration of the nodules and the strands or fibers embedded therein can be modified by use of different laser power delivery regimes or protocols.

Figure 5:
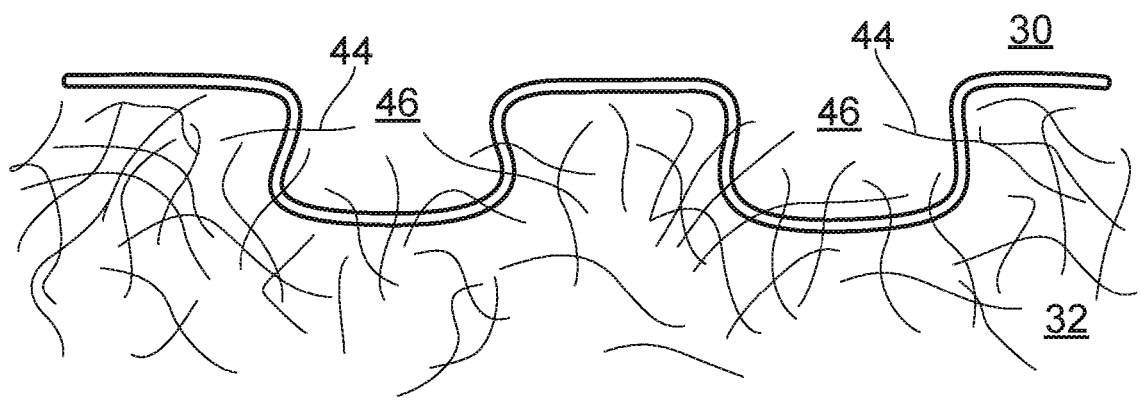
FIG. 5 shows a schematic cross-section through a first example workpiece welded using an embodiment of the disclosure.

FIG. 5 shows a cross-sectional representation (not to scale) of a first example workpiece welded according to an embodiment of the disclosure. The solid metal component 30 has been melted during the welding process and has flowed to form two nodes or nodules 46. Each nodule is penetrated by a plurality of metal fibers 44 comprised within the porous metal component 32, and those metal fibers 44 are thereby integrated into the material of the solid metal component 30. For the purposes of illustration, the plurality is represented by 7-8 strands 44 in this example. At least some of fibers 44 extend through the side of a nodule 46, having part of their length inside the nodule (and secured by the surrounded solidified metal) and part of their length outside the nodule and forming the porous structure of the porous metal component. Some fibers 44 might be wholly within a nodule 46. In a real example, more nodules may be formed, with more or fewer strands per nodule. Note, however, that the multiple nodules can be formed from a single weld action using a single laser beam; there is not just one nodule per weld action or beam exposure. The mechanical strength of the weld (assessed, for example, by a peel test in which the force required to peel apart the welded components is measured) will vary with the number of nodules and the number of strands per nodule. Also, the electrical resistance will vary with these structural factors. In some applications, the electrical resistance will be of particular interest, and it might be found, for example, that a very secure weld providing high strength will also have a resistance which is too high for a particular application (especially bearing in mind that two welds might be included in an electrical circuit, such as the electrical heating element in FIGS. 1 and 2). Modification of the welding protocol can change the structure to reduce the electrical resistance, to be balanced against an appropriate mechanical strength.

Figure 6:
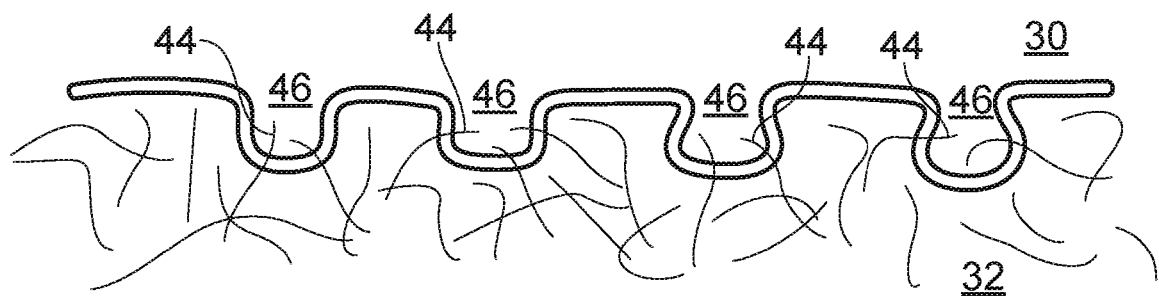
FIG. 6 shows a schematic cross-section through a second example workpiece welded using an embodiment of the disclosure.

FIG. 6 shows a cross-sectional representation (not to scale) of a second example workpiece welded according to a second embodiment of the disclosure. In this example, a lower laser power has been used compared to the example of FIG. 5; other parameters are the same. This regime produces an increased number of nodules 46 (four shown in this example), but with a reduced number of strands 44 per nodule (2-3 as illustrated), or, conversely, an increased number of nodules per strand. These numbers are illustrative only and not necessarily representative of a real life example; however, reduced laser power can be used to modify the weld structure in this way. This different structure tends to have a reduced electrical resistance compared to the example of FIG. 5, and may also have a similar or increased mechanical strength since more nodules are formed, even though the total number of strands involved over the weld might be fewer.

Experimental Results

In testing, a quantity of welds have been carried out. In these experiments, the solid metal component was an electrical contact (such as shown in FIGS. 1 and 2) and was made from stainless steel 301 and had a thickness of 0.2 mm. The porous metal component was a heating element (such as shown in FIGS. 1 and 2) with a thickness of 0.16 mm, and was made from stainless steel 316L, comprising metal fibers of 8 µm diameter sintered together in a random alignment to give a material density of 200-250 $g/m^2$ and a porosity of 84%.

The laser used was a ML-2450A laser manufactured by Amada Miyachi; this is a Nd:YAG laser and hence operates at a wavelength of 1064 nm. The beam was focused to a focal spot size of 400 µm, with this spot positioned on the near surface of the solid metal component. Other focal spot sizes might be used, for example with reference to the intended size of the welded area, such as between 400 µm and 600 µm. To effect the weld, the laser was operated following a regime of varying output power over the welding time.

Figure 7:
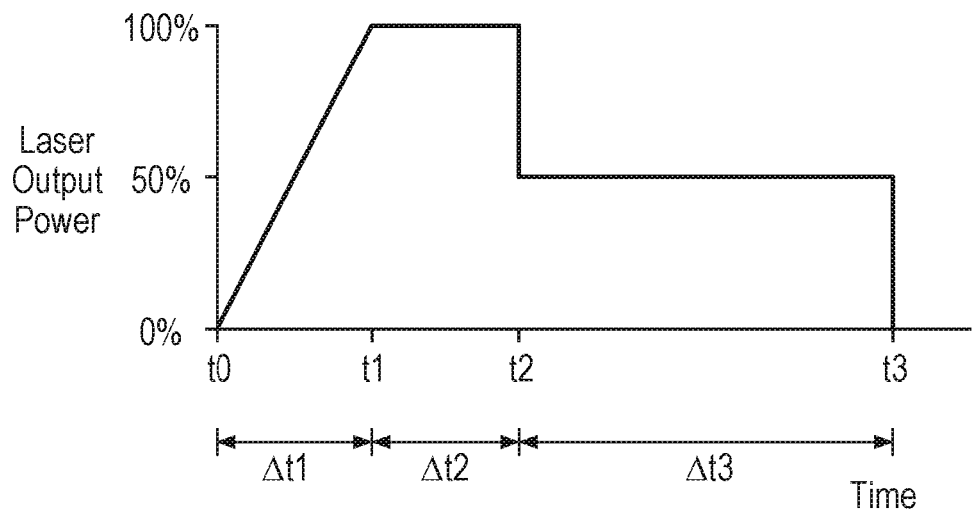
FIG. 7 shows a plot of an example of laser power output suitable for use in a embodiment of the disclosure.

FIG. 7 shows a plot illustrating the output power of the laser over the weld process. During an initial start-up period (switch on time) starting at time t0 and extending over a period $\Delta t1$ to a time t1, the output power ramped up from nothing to 100%. The value of the full 100% output power (laser power setting) was varied between experiments. A linear ramp is assumed. Then, over a time period $\Delta t2$ extending from t1 to t2, the laser was operated at 100% power. Finally, starting at time t2, the output power was reduced to 50% and the laser operated for a further time period $\Delta t3$, ended at time t3. The durations of $\Delta t1$, $\Delta t2$ and $\Delta t3$, and also the total welding time $\Delta t1+\Delta t2+\Delta t3$ were varied between experiments.

Table 1 shows the power regimes followed for 30 experiments, including the total amount of energy delivered to each workpiece. Calculation of the amount of energy assumes continuous wave laser operation.

TABLE 1

| Experiment | Power setting (kW) | $\Delta t1$ (ms) | $\Delta t2$ (ms) | $\Delta t3$ (ms) | Energy (J) |
|---|---|---|---|---|---|
| 1 | 1.4 | 1 | 1 | 1 | 2.8 |
| 2 | 1.6 | 1 | 1 | 1 | 3.2 |
| 3 | 1.8 | 1 | 1 | 1 | 3.6 |
| 4 | 1.6 | 1 | 1 | 2 | 4.0 |
| 5 | 1.6 | 1 | 1 | 2 | 4.0 |
| 6 | 1.4 | 1 | 1 | 3 | 4.2 |
| 7 | 1.3 | 1 | 1 | 4 | 4.55 |
| 8 | 1.8 | 1 | 1 | 2 | 4.5 |
| 9 | 1.2 | 1 | 1 | 5 | 4.8 |
| 10 | 1.4 | 1 | 1 | 4 | 4.9 |
| 11 | 1.4 | 1 | 1 | 4 | 4.9 |
| 12 | 1.2 | 1 | 1 | 6 | 5.4 |
| 13 | 1.2 | 1 | 1 | 6 | 5.4 |
| 14 | 1.5 | 1 | 1 | 4 | 5.25 |
| 15 | 1.4 | 1 | 1 | 5 | 5.6 |
| 16 | 1.5 | 1 | 1 | 5 | 6.0 |
| 17 | 1.4 | 1 | 1 | 6 | 6.3 |
| 18 | 1.4 | 1 | 1 | 6 | 6.3 |
| 19 | 1.4 | 1 | 1 | 6 | 6.3 |
| 20 | 1.2 | 1 | 1 | 8 | 6.6 |
| 21 | 1.2 | 1 | 1 | 8 | 6.6 |
| 22 | 1.6 | 1 | 1 | 6 | 7.2 |
| 23 | 1.6 | 1 | 1 | 6 | 7.2 |

TABLE 1-continued

| Experiment | Power setting (kW) | Δt1 (ms) | Δt2 (ms) | Δt3 (ms) | Energy (J) |
|---|---|---|---|---|---|
| 24 | 1.4 | 1 | 1 | 8 | 7.7 |
| 25 | 1.6 | 1 | 2 | 5 | 8.0 |
| 26 | 1.6 | 2 | 2 | 4 | 8.0 |
| 27 | 1.8 | 1 | 2 | 5 | 9.0 |
| 28 | 1.8 | 2 | 2 | 4 | 9.0 |
| 29 | 2 | 1 | 2 | 5 | 10.0 |
| 30 | 2 | 2 | 2 | 4 | 10.0 |

The resulting welded workpieces were tested and characterized according to the mechanical strength of the weld, or peel strength, and the electrical resistance of the weld. The peel strength was characterized as poor (indicating no bonding), good or very good (or not applicable, N/A, if not tested). The electrical resistance was characterized as high (over 20 mOhms), medium (med, 10-20 mOhms) or low (less than 10 mOhms). The results are shown in Table 2, including the energy also shown in Table 1.

TABLE 2

| Experiment | Peel strength | Resistance (mOhms) | Energy (J) |
|---|---|---|---|
| 1 | N/A | high | 2.8 |
| 2 | N/A | med | 3.2 |
| 3 | N/A | med | 3.6 |
| 4 | poor | high | 4.0 |
| 5 | poor | high | 4.0 |
| 6 | poor | high | 4.2 |
| 7 | poor | high | 4.55 |
| 8 | good | high | 4.5 |
| 9 | good | med | 4.8 |
| 10 | good | med | 4.9 |
| 11 | v good | low | 4.9 |
| 12 | poor | high | 5.4 |
| 13 | poor | high | 5.4 |
| 14 | good | med | 5.25 |
| 15 | v good | low | 5.6 |
| 16 | poor | med | 6.0 |
| 17 | good | med | 6.3 |
| 18 | good | low | 6.3 |
| 19 | good | low | 6.3 |
| 20 | v good | low | 6.6 |
| 21 | v good | low | 6.6 |
| 22 | good | med | 7.2 |
| 23 | good | med | 7.2 |
| 24 | v good | med | 7.7 |
| 25 | N/A | high | 8.0 |
| 26 | N/A | high | 8.0 |
| 27 | N/A | high | 9.0 |
| 28 | N/A | high | 9.0 |
| 29 | N/A | high | 10.0 |
| 30 | N/A | high | 10.0 |

From these results, it can be seen that there is a regime in which a lower amount of energy is delivered (lower numbered experiments) and the outcome is generally poor, in that the mechanical strength of the weld is poor, and it has a high resistance. By contrast, a regime for the higher numbered experiments in which a much greater amount of energy was delivered also has a poor outcome for some applications. The strength of the mechanical bond may be improved, but the resistance is still high. An intermediate regime delivering a more moderate amount of energy gives a result which is particularly useful, in that the mechanical strength is good or very good, and the electrical resistance is low or medium.

Considering the figures with regard to this particular example workpiece, it is possible to note that a total amount of energy exceeding 4.5 J but not exceeding 8.0 J gives useful results when delivered using a regime like that shown in FIG. 7. More specifically, an energy delivery of between about 6.0 J and 7.0 J gives particularly good results in terms of good peel strength and low resistance.

Looking at the results in more detail, note that the most useful results produced from moderate energy delivery correspond to a laser operating protocol in which the duration of Δt3 significantly exceeds the duration of Δt2. In other words, the time for which a reduced power level is used is several multiples of the time for which the full or higher power level is used (the higher power may or may not be the full operating power of which the laser is capable). The experimental results at the top and bottom of Tables 1 and 2, in which Δt3 is the same as or only 2 or 2.5 times longer than Δt2, gave poorer results in terms of low peel strength and/or high resistance. Conversely, results from the mid-part of Tables 1 and 2 correspond to the better results. An initial amount of energy at full power is delivered during Δt2 to initiate the heating and melting, and then a reduced amount of energy is delivered over a longer time scale Δt3 to sustain the heat propagation and the molten condition and give time for the nodules to form, without providing an excess amount of energy that might damage either component or cause too much melting. From the results, a regime in which ratio of Δt2 to Δt3 is greater than or equal to 1:3 or greater than or equal to 1:4 can be considered useful. Also, delivering too much energy even at a low power might be damaging so an upper limit might also be considered, for example a ratio of between 1:4 and 1:8 or between 1:3 and 1:8 (the latter ratio in these ranges being the highest from the experimental data). Within this range, higher ratios correspond to the better results in Table 2, so in some embodiments the ratio might be set to be in the range of between 1:6 and 1:8.

In other experiments, much larger ratios have been found to produce good results. In some experiments, the high power level was in the range of 1.2 kw and 1.4 kW. A high power level such as this may be delivered for between 0.1 ms and 0.2 ms, and a lower power level, for example 50% of the high power level, may then be delivered for a further 4 ms to 8 ms. The lower power is delivered for 20 or 40 or 80 times longer than the higher power. Thus the ratio of Δt2 to Δt3 may, in some cases, be 1:20 or above, or 1:40 or above, or 1:80 or above, or in the range of 1:20 to 1:80, or 1:20 to 1:40, or 1:40 to 1:80. Ratios between these values and the smaller ratios discussed above might also be used, for example, in the range of 1:10 to 1:15.

Overall, therefore, a welding method may be implemented with a ratio of Δt2 to Δt3 in the range of 1:3 to 1:80, although this is not limiting.

The experiments used a reduced power during Δt3 of 50% of the full power in Δt2. However, useful results can also be obtained for other reduced power levels, for example in a range with a lower limit of 30% or 35% or 40% or 45% and an upper limit of 55% or 60% or 65% or 70%. Also, the reduced power stage might be omitted, so that during Δt3 full power is applied, or at least the same power as during Δt2. A weld will still be achieved. Note that "full power" and 100% power does not necessarily mean the total power which the laser is capable of producing, rather it means the power level used during the Δt2 period, and to which the operating power is ramped during the Δt1 period. Depending on the type of laser employed, any ramping period might be more or less significant, or a shuttering system might be employed to shield the workpiece during the switch-on stage and hence eliminate the ramping from the energy delivery protocol. For the experimental examples corresponding to the preferred results, the duration of the ramping period $\Delta t1$ is the same as the ramping period $\Delta t2$; this is not essential, however.

Also from the experimental results it can be observed that power levels during the full power level period that did not exceed 1.8 kW gave good results. It was found that power levels of 1.8 kW and above tended to give a poorer weld, in particular in terms of high electrical resistivity. Also, very low power levels require a longer welding time, and below a threshold will not produce sufficient heating to cause the required degree of melting. One hundred percent power levels in the range of 1 kW to less than 1.8 kW are considered particularly useful. A full power level in the range of 1.2 kW to 1.6 kW may also be used, or in the range 1.2 kW to 1.4 kW. Recalling the structure shown in the example of FIG. 6, in which reduced power produces more nodules with fewer fibers per nodule, this may be achieved with full power levels of 1.5 kW and below, for example, between 1.0 kW and 1.5 kW. The power level should be modified in accordance with the type of metal, the laser wavelength and the solid metal component thickness, as the skilled person will appreciate. Hence, embodiments of the disclosure are not limited to the power levels quoted above; these are examples only.

Recall that for these experiments the solid metal component had a thickness of 0.2 mm and the porous metal component had a thickness of 0.16 mm. Clearly, a solid metal component with a thickness many times larger than 0.2 mm will inhibit successful welding at the power and energy regimes discussed above, because the laser beam will be absorbed far from the interface region and thermal propagation may not be adequate to melt the metal in the interface region. However, it is expected that a solid metal component with a thickness in the range of 0.05 mm to 0.5 mm, for example 0.05 mm to 0.5 mm, 0.05 mm to 0.45 mm, 0.05 mm to 0.4 mm, 0.05 mm to 0.35 mm, 0.05 mm to 0.3 mm, 0.05 mm to 0.25 mm, 0.1 mm to 0.5 mm, 0.1 mm to 0.45 mm, 0.1 mm to 0.4 mm, 0.1 mm to 0.35 mm, 0.1 mm to 0.3 mm, 0.1 mm to 0.25 mm, 0.15 mm to 0.5 mm, 0.15 mm to 0.45 mm, 0.15 mm to 0.4 mm, 0.15 mm to 0.35 mm, 0.15 mm to 0.3 mm, or 0.15 mm to 0.25 mm will be successfully welded using the discussed protocols. The thickness of the porous metal component is considered to be less significant since the laser and heat energy do not have to pass through this layer to form the weld. Instead, there may be circumstances in which the thinness of the porous metal component is more of interest, since if it is very thin, the weld may also cause at least partial bonding of the work piece to any additional component underneath the porous metal component, i.e. opposite to the incident laser beam. This might arise from molten metal in the nodule passing through the whole thickness of the porous component, or from melting or softening of the metal strands in the porous metal component, or from melting or softening of the material of the additional component, for example. Any such bonding may or may not be of concern, and in some cases might be beneficial. It may be addressed by holding the workpiece separately during welding, rather than assembling the porous metal component with other components that lie beneath it before welding. In the present examples of interest, however, the porous metal component might have a thickness in the range of 0.15 mm to 0.17 mm, 0.14 mm to 0.18 mm, 0.13 mm to 0.19 mm or 0.12 mm to 0.2 mm, 0.1 mm to 0.22 mm or 0.08 to 0.24 mm, for example.

For applications in which the weld is required to provide an electrical connection, a low electrical resistivity is of interest. Embodiments of the present disclosure are able to achieve a resistance of 10 mOhms or less. Resistance values of between 10 mOhms and 20 mOhms may be of interest in some devices.

It is desirable during any welding process, including laser welding, to avoid the formation of air pockets in the weld joint. This can be addressed in laser welding by applying compression during welding. In the present case, compression should be used with caution owing to the presence of the porous metal component. Too much compression may permanently squash and hence damage the structure of the porous material, reducing its porosity, increasing density, and possibly rendering it unfit for its intended purpose. Therefore, if it is found when utilizing embodiments of the disclosure that air pocket formation needs to be eliminated, compression at a force of between 0.1 N and 5.0 N may be applied. It may be found that no compression is needed, i.e. a force of 0 N. Overall then, a compression force of between 0 N and 5 N inclusive may be applied across the interface region during application of the laser beam to form the weld. Forces of this magnitude are suitable for the type of porous metal component used in the experiments described herein. Higher forces might be used if the porous metal component can withstand them, or if possible structural damage is less important.

To increase absorption of the laser energy by the metal during the welding process, any highly reflective surfaces can be eliminated. For example, any reflective coatings or layers may be removed from the surface of the components in the interface region, and any surface polishing may not be employed in the interface region areas. Surface treatment specifically to reduce reflectivity might also be used.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. A method of laser welding comprising:
   placing a solid metal component in contact with a porous metal component at an interface region;
   directing a laser beam onto the solid metal component to cause heating and melting of one or more portions of the solid metal component in the interface region; and
   allowing the melted metal portions to flow into interstices in the porous metal component and solidify by cooling such that portions of the porous metal component adjacent the interstices are integrated into the metal of the solid metal component thereby bonding the solid metal component and the porous metal component;
   wherein the porous metal component comprises a mesh of metal fibers sintered together, and the portions of the porous metal component adjacent the interstices which are integrated into the metal of the solid metal component are metal fibers.

2. The method according to claim 1, wherein one or both of the solid metal component and the porous metal component comprise stainless steel.

3. The method according to claim 1, wherein the laser beam is operated for a first time period at a first output power level and then for a second time period at a second output power level less than the first output power level.

4. The method according to claim 3, wherein the first time period and the second time period have durations with a ratio in the range of 1:3 to 1:80.

5. The method according to claim 3, wherein the second output power level is between 40% and 60% of the first output power level.

6. The method according to claim 3, wherein the first time period is preceded by an initial period during which an output power level of the laser beam is increased from zero to the first output power level.

7. The method according to claim 3, wherein the first output power level is in a range of 1 kW to less than 1.8 kW.

8. The method according to claim 1, wherein the laser beam delivers a total amount of energy to the metal component in a range of more than 4.5 J to less than 8.0 J.

9. The method according to claim 1, wherein the method further comprises applying a force across the interface region to compress the solid metal component and the porous metal component while the laser beam is directed onto the solid metal component.

10. The method according to claim 1, wherein the solid metal component has a thickness in a range of 0.05 mm to 0.5 mm.

11. The method according to claim 1, wherein the solid metal component is an electrical contact and the porous metal component is a heating element for forming an aerosol from a liquid in an aerosol provision system.

12. An assembly comprising:
a solid metal component and a porous metal component bonded together at a weld by portions of the porous metal component adjacent to interstices in the porous metal component that are integrated into at least one portion of the solid metal component that has entered the interstices, wherein the porous metal component comprises a mesh of metal fibers sintered together, and the portions of the porous metal component adjacent the interstices which are integrated into the at least one portion of the solid metal component are metal fibers.

13. An assembly comprising a solid metal component and a porous metal component comprising a mesh of metal fibers sintered together, that have been bonded together at a weld by a laser welding method according to claim 1.

14. The assembly according to claim 12, wherein the weld has an electrical resistance to electric current flowing from one of the solid metal component or the porous metal component to the other of the solid metal component or the porous metal component of 10 mOhms or less.

15. A method of laser welding comprising:
arranging a solid metal component in contact with a porous metal component comprising of a plurality of sintered metal strands;
directing a laser beam onto the solid metal component to deliver energy thereto;
allowing the energy to heat and melt at least a portion of the solid metal component which is in contact with the porous metal component so that the melted metal flows around metal strands in the porous metal component;
removing the laser beam; and
cooling the melted metal that has flowed around the metal strands so that the metal strands are embedded into the solid metal component to bond the solid metal component to the porous metal component.

* * * * *